Patented Oct. 5, 1948

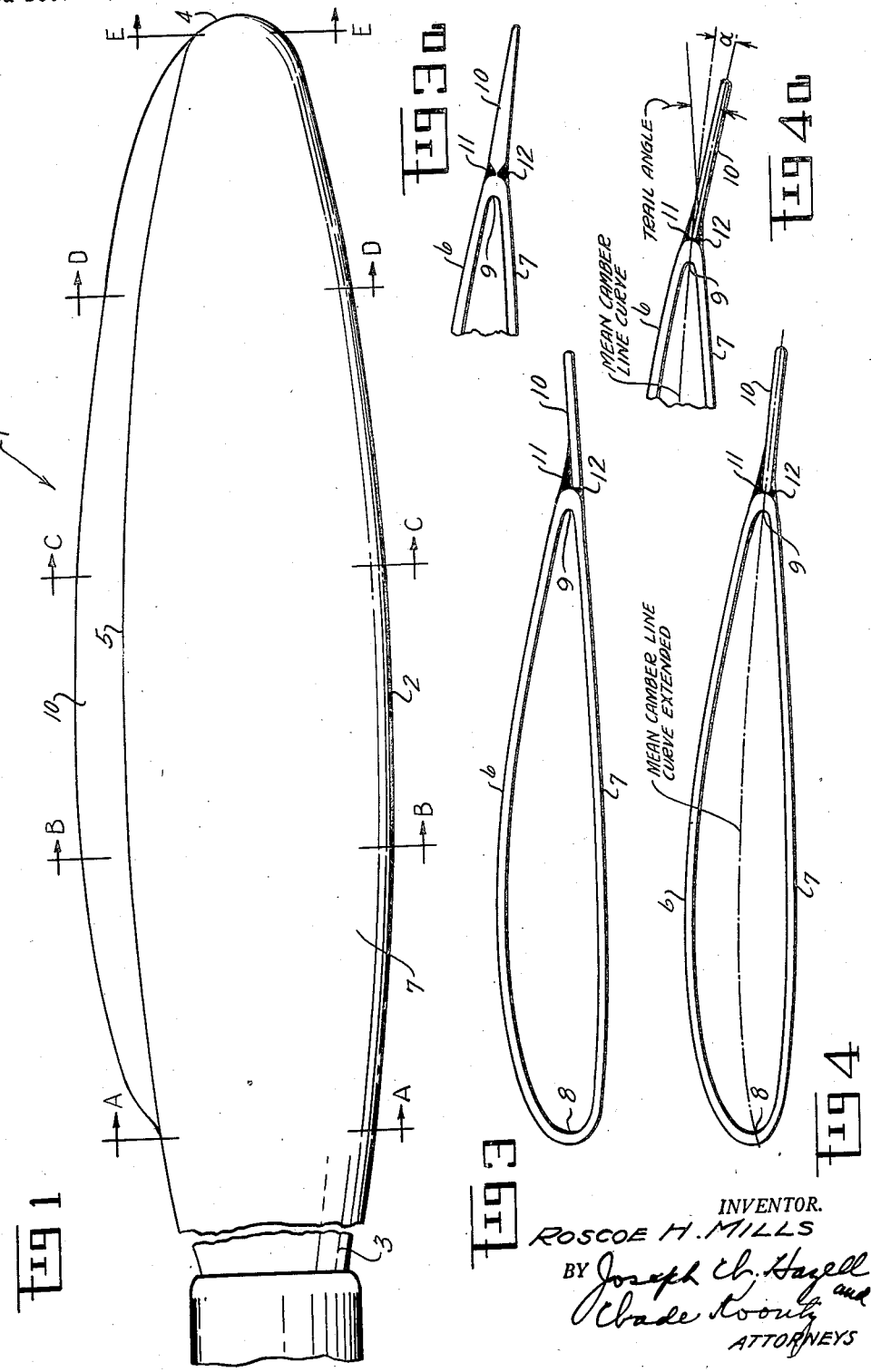

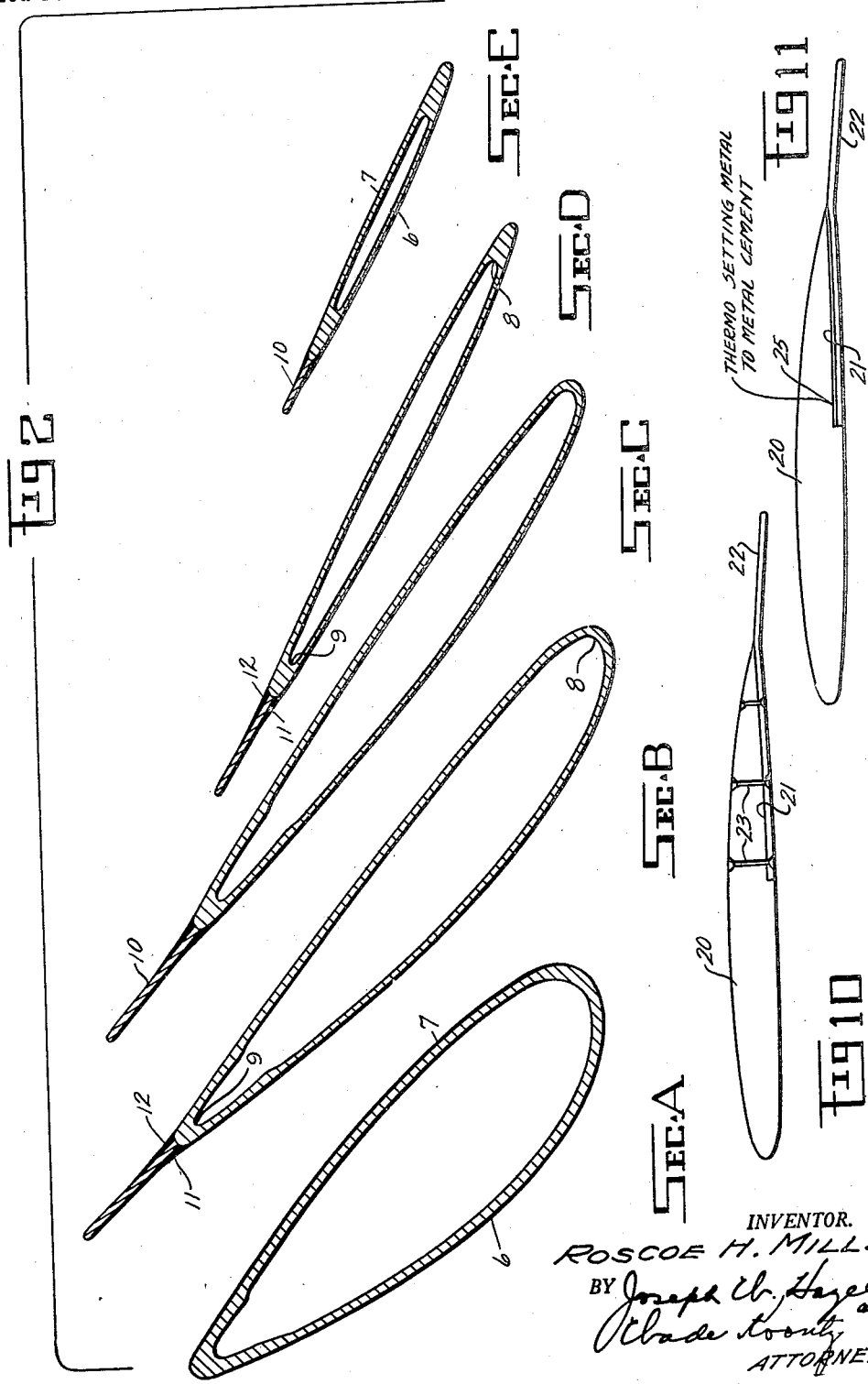

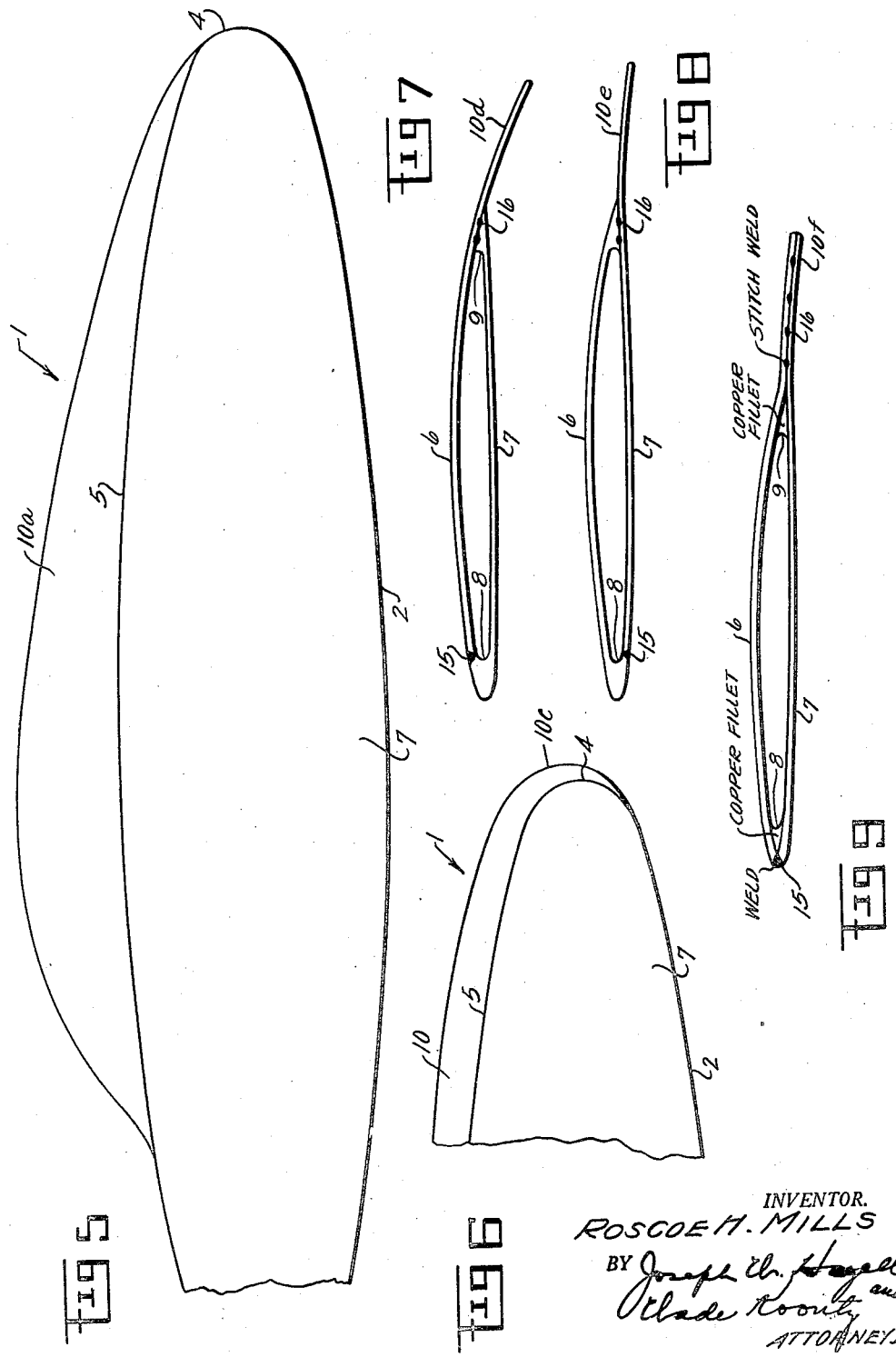

2,450,440

UNITED STATES PATENT OFFICE 2,450,440

PROPELLER BLADE CONSTRUCTION

Roscoe H. Mills, Dayton, Ohio

Application December 19, 1944, Serial No. 568,914

3 Claims. (Cl. 170—159)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to airplane propeller blade construction whereby a basic propeller blade may be modified by adding a trailing edge extension thereto to thereby vary blade area and where desired, the blade pitch distribution so that a basic design may be employed to cover a much wider power and speed range than was previously possible. The invention has particular application to hollow steel propellers though in no way limited to such application.

Present day propellers particularly for use on high power aviation engines have their design fixed as to diameter by ground clearance requirements, the blade area and pitch distribution being fixed by the power to be absorbed, the altitude range of operation, the high speed of the airplane, and the permissible engine speed of rotation. A propeller, such as of hollow steel construction, designed for a particular airplane flight speed, altitude range and particular engine cannot be changed once in production without encountering enormous expense in retooling and its attendant delays, particularly where the diameter cannot be altered. If the engine power output is changed for a particular airplane, such as by employing a supercharged engine, the propeller blade area must be increased, and generally, the pitch distribution must be altered to absorb the increased power particularly at high altitudes or else the acceptance of a reduced performance from that which might otherwise be obtained.

In accordance with the present invention, a basis design of propeller blade may be altered to suit changed operating conditions so that, to a certain degree, the blade diameter may be varied and considerable changes may be made in blade area and pitch distribution. Where, for example, it is desired to alter an existing hollow steel propeller so as to increase the blade width to give an increased blade area to take care of increased power requirements, a thin steel strip is welded to the trailing edge of the basic propeller blade and bent such that the trailing edge extension forms an extension of the mean camber line of the airfoil sections of the blade. Where change in pitch distribution as well as blade area is desired, the trailing edge extension may be bent to alter the mean camber line curve of the resultant airfoil sections to change the aerodynamic characteristics of the respective sections. The trailing edge extension may be carried around to the propeller tip to also increase propeller diameter, if such increase is permissible, or a separate tip may be welded on. Since the welded joint may be made from both sides of the metal sheet forming the trailing edge extension, the particular method of welding employed is not critical and arc, acetylene and electric flash welding are suitable welding procedures.

Extensive tests on propeller blades constructed in accordance with the invention have shown that modification of the basic airfoil sections of the blade has a much less detrimental effect on section characteristics than was at first anticipated so that the principles of the invention may be incorporated in new designs to give a much greater flexibility in metal propeller blade manufacture. When applied to new designs, the trailing edge extension may be formed as an integral extension of the upper or lower envelope sheets, or by extending both sheets, which permits the propeller blade width and pitch distribution to be widely varied so that one basic propeller design may be altered to suit a wide variety of operation requirements.

The blade modifications, in accordance with the invention, may be employed with non-ferrous propeller blades by securing the blade extension to the basic blade by riveting or by use of the recently-developed, high strength thermosetting metal to metal adhesives.

It is therefore the principal object of the invention to provide a simple means for varying propeller blade diameter, blade area and pitch distribution without alteration of the basic propeller blade.

It is a further object of the invention to provides means for varying propeller blade area, and if desirable, the pitch distribution by securing a trailing edge extension to the basic propeller blade to vary the blade area and adjusting the angle of the said extension with respect to the chord line of the airfoil sections of the basic blade to vary the pitch distribution.

Other objects and features of the invention, not specifically enumerated above, will appear by reference to the detailed description hereinafter given and to the appended drawings in which:

Fig. 1 is a developed plan view of a propeller blade modified in accordance with the invention; and Fig. 2 is a view showing enlarged cross sections of the propeller of Fig. 1 taken on section lines A—A to E—E inclusive respectively; and Fig. 3 is an enlarged fragmentary view showing a typical welded joint between the basic propeller blade and the trailing edge extension in the propeller of Fig. 1; and Fig. 3a is a view similar to Fig. 3, but showing the alternative use of a trailing edge extension tapered in thickness in the chordwise direction in lieu of the plate of constant thickness employed in the blade of Figs. 1 and 2; and Figs. 4 and 4a illustrate respectively a cross-section of the propeller of Fig. 1 in which the trailing edge extension is arranged to conform with the mean camber line curve of the basic airfoil section and an arrangement where the trailing edge extension is arranged at an angle to a continuation of the mean camber line curve of the basic airfoil section to thereby vary the airfoil section characteristics of the blade section; and Fig. 5 is a view similar to Fig. 1 showing a trailing edge extension of variable width; and Fig. 6 is a view similar to Fig. 1 showing a trailing edge extended to the blade tip to increase blade diameter as well as blade area; and Fig. 7 is a cross-sectional view illustrating a modified form of the invention in which the trailing edge extension is made as an integral part of the upper envelope sheet of a hollow steel propeller blade; and Fig. 8 is a view similar to Fig. 7, but showing the trailing edge extension integral with the bottom cover or envelope sheet of a hollow steel propeller blade; and Fig. 9 is a view similar to Fig. 7, but showing the trailing edge extension made integral with upper and lower envelope plate members of a hollow steel propeller blade; and Fig. 10 is a cross-sectional view showing the application of a trailing edge extension to a typical aluminum or other non-ferrous propeller blade by means of rivets; and Fig. 11 is a view similar to Fig. 10 showing the application of a trailing edge extension to a non-ferrous propeller blade by means of a thermosetting adhesive.

Referring now to Fig. 1, the reference numeral 1 generally indicates a hollow steel propeller blade which may be made in accordance with any one of a number of well-known methods such as from a die formed tube, upper and lower plate members each die formed and welded along the leading and trailing edge, or by transverse butt welded hollow formed blade sections. The propeller 1, as initially constructed, has a leading edge 2 joining the blade shank 3 and tip portion 4 and a trailing edge 5. The blade, as seen in the cross-sectional views thereof in Fig. 2, is hollow and is formed of airfoil section having an upper camber plate portion 6, a lower camber plate portion 7 and fillets 8 and 9 merging the plates together. The blade area of the basic propeller blade 1 is increased by the trailing edge extension 10 made of steel plate of uniform thickness and secured to the original trailing edge 5 by fillet welds 11 and 12 made from opposite sides of the plate respectively where, for example, shielded arc welding or torch or furnace brazing is employed, while if electrical flash butt welding is employed, there will be but a single weld. The welded joint is ground off smooth, note Fig. 3, after which the extension is bent to give the desired pitch distribution of the resultant blade. The blade, as a whole, is then normalized to stress, relieve the weld, and any final forming done with soft hammers.

Fig. 3a illustrates a trailing edge extension tapered in thickness in the chordwise direction and welded to the trailing edge 5 of the blade, which simplifies the fairing of the extension into the blade sections and would be a preferable form of construction where electric flash butt welding is employed.

As seen in Fig. 4, the trailing edge extension 10 of Fig. 1 is arranged so that it lies in the plane of the mean camber line curve extended of the basic propeller blade airfoil section, and hence, will change the aerodynamic section characteristics very little so that if the trailing edge extension is warped so as to lie in the plane of the mean camber line curve at each radius, the total effect on the propeller, as a whole, will be primarily that due to a change in blade area. If, however, the plane of the trailing edge extension makes an angle such as at $a$, Fig. 4a, with the mean camber line curve extended of the basic propeller blade section at each radial station, the aerodynamic characteristics of the basic airfoil sections can be considerably altered. If the angular relation between the zero lift lines of the resultant airfoil sections retain the same geometric relation as in the basic propeller blade, the pitch distribution will be substantially unchanged, and the thrust of the modified blade will then depend on the change in aerodynamic section characteristics as well as increase in blade area. If the angles of the zero lift lines of the modified airfoil sections of the propeller blade have a different variation from that in the basic propeller blade, the pitch distribution, aerodynamic section characteristics, and blade area will be simultaneously altered, giving three variables, subject to change. The fact that a trailing edge extension, even of small width, can be employed to either vary the blade area, to increase the blade area and aerodynamic characteristics of the blade sections, or simultaneously change blade area section characteristics and pitch distribution is largely responsible for the increased flexibility given to propeller blade manufacture by the invention.

The trailing edge extension, illustrated in Fig. 1, is of substantially constant width throughout its length except where it fairs into the main blade planform adjacent the blade tip and root portions. Considerable change may be made, however, in the blade planform by varying the width of the extension such as indicated by the variable width extension 10a shown in Fig. 5, or the blade trailing edge extension may be made to include a tip portion 10c, Fig. 6, to give an increased tip radius as well as increased blade area.

The principles of the invention are readily applied to certain types of hollow steel propeller blades during the course of manufacture as an integral part of the blade as seen in Figs. 7, 8, and 9, which will now be separately described.

The construction in Fig. 7 is of the type where the upper and lower camber faces 6 and 7 of the propeller blade are made of separate stamped or forged and machined sheets, the trailing edge extension 10d, however, being formed as an integral part of the upper camber sheet 6 and the sheets 6 and 7 being welded at the leading edge and at the aft terminal edge of sheet 7, as indicated by reference numerals 15 and 16 respectively, the latter welds being, for example, overlapping spot or stitch welds. The trailing edge extension 10d may be cut or ground to give any desired blade area and bent to give a desired pitch distribution. The blade may then be finally normalized and brazed copper internal fillets formed in the manner well known in the art. This manner of construction of propeller blades allows considerable variation to be made without requiring any manufacturing methods changes, such as new dies or forming tools.

The blade shown in Fig. 8, is identical with that illustrated in Fig. 7, with the exception that the trailing edge extension 10e is formed as an integral part of the lower camber sheet 7.

The construction of Fig. 9 is a combination of the construction of Figs. 7 and 8 in which the trailing edge extension 10f is formed by extended portions of the upper and lower camber sheets 6 and 7, this construction being particularly advantageous in that a plurality of rows of stitch welds may be employed to secure the trailing edge extension sheets to each other and form a joint highly resistant to fatigue failure.

Although solid non-ferrous propeller blades, such as of aluminum alloy, are generally formed by forging and contour milling, involving much less expense in design changes than in hollow steel manufacturing processes, the principles of the invention may be applied to such propeller blades in the manner illustrated in Figs. 10 and 11. In each of these figures the solid basic propeller blade 20 is recessed on its under camber as indicated at 21 so as to provide for flush mounting of a metal trailing edge extension 22 therein, which may extend beyond the trailing edge of the basic blade section any desired amount. The trailing edge extension 22 may be secured to the blade proper by means of countersunk rivets 23, Fig. 10, or screws, not shown, may be employed, or the extension 22 may be cemented to the blade proper by any one of a number of commercially available thermosetting metal-to-metal adhesives such as the cement known as "Cycleweld," as indicated at 25 in Fig. 11.

It will be apparent to those skilled in the art that other variations and forms of the invention may be made falling within the scope of the invention as defined in the appended claims.

I claim:

1. In a basic propeller blade construction having the cross-sections thereof of airfoil section terminating in a trailing edge, means for increasing the blade area and altering the pitch distribution, comprising a thin rigid metal plate secured to the basic blade such that the plate extends beyond the said basic blade trailing edge to increase the blade area, and the said plate extending radially over at least the working section of the blade, and the plane of the plate at any point being warped angularly away from the plane containing the extended mean camber line curves of the blade sections at that point, the angle of warpage changing progressively from the shank end of the blade to the tip to thereby alter the aerodynamic properties of the sections and to alter the distribution of pitch from that of the basic blade.

2. The structure as claimed in claim 1, in which the basic propeller blade is of hollow steel construction and said rigid sheet metal plate being in the form of a trailing edge extension welded along one edge on both sides of the plate to the trailing edge of the basic blade whereby it is smoothly faired by said welds into the respective blade sections thereof.

3. The structure as claimed in claim 1, in which the rigid sheet metal plate member forming the trailing edge extends around and is welded to the tip of the basic propeller blade to thereby increase the tip radius as well as increasing the blade width and area.

ROSCOE H. MILLS.

REFERENCES CITED

The following references are of record in the file of this patent:

UNITED STATES PATENTS

| Number | Name | Date |
|---|---|---|
| 1,833,529 | Moody | Nov. 24, 1931 |
| 1,939,357 | Lorenzen | Dec. 12, 1933 |
| 2,063,706 | Soderberg | Dec. 8, 1936 |
| 2,357,628 | Boerger | Sept. 5, 1944 |

FOREIGN PATENTS

| Number | Country | Date |
|---|---|---|
| 283,520 | Italy | Mar. 13, 1931 |
| 440,655 | Great Britain | Jan. 3, 1936 |
| 603,100 | France | Jan. 6, 1926 |